April 19, 1966     N. J. STEVENS     3,246,634
DIRECT FIRED HEATER FOR HEATING LIQUEFIED GASES
Filed Aug. 17, 1964
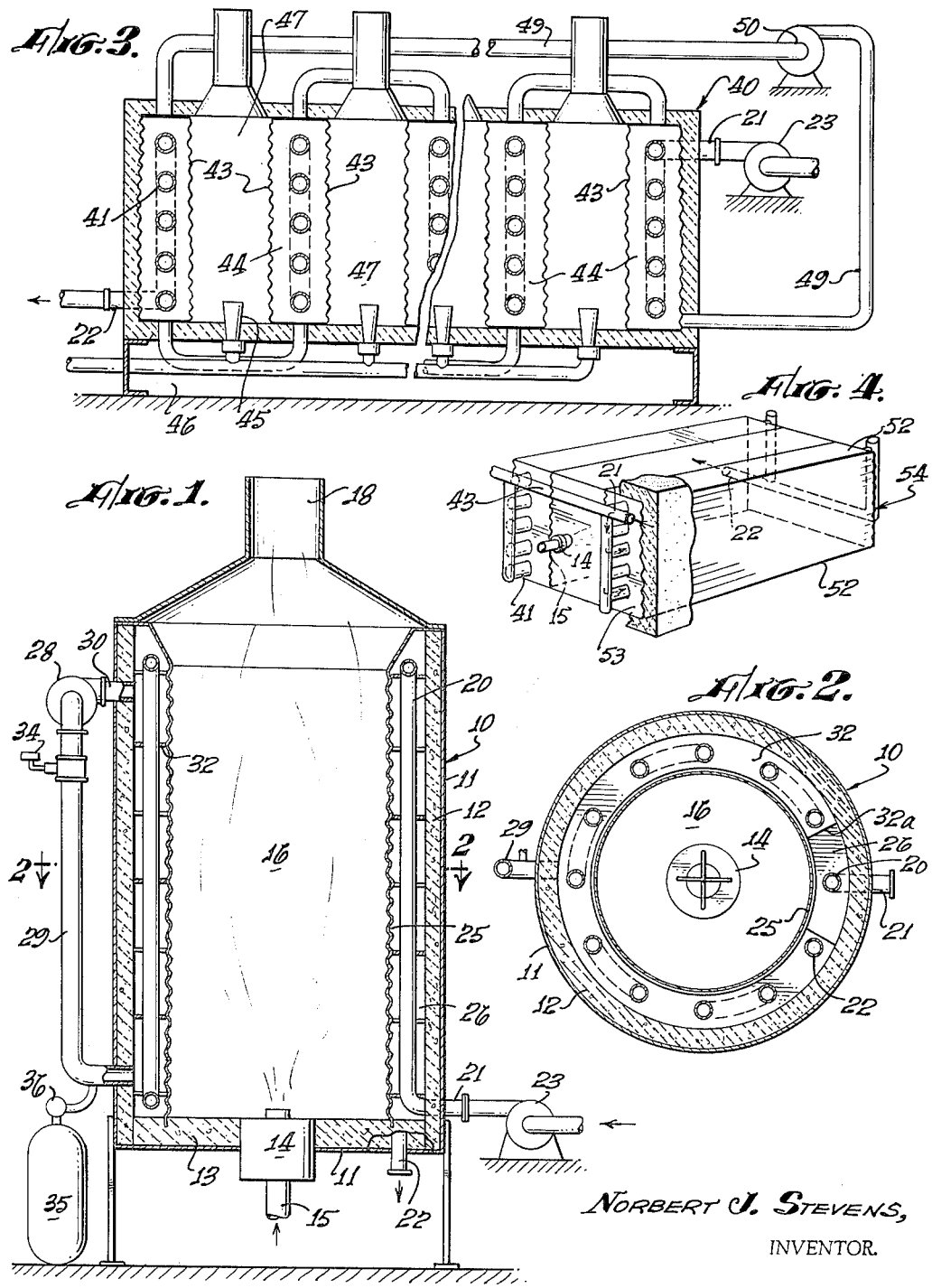
Norbert J. Stevens,
INVENTOR.
BY Knight & Rodgers
ATTORNEYS United States Patent Office 3,246,634
Patented Apr. 19, 1966

3,246,634
DIRECT FIRED HEATER FOR HEATING LIQUEFIED GASES
Norbert J. Stevens, 1208 N. Almansor, Alhambra, Calif.
Filed Aug. 17, 1964, Ser. No. 391,359
7 Claims. (Cl. 122—33)

This application is a continuation-in-part of my copending application Serial No. 221,205 filed September 4, 1962, now abandoned, of the same title.

The present invention relates generally to direct fired heaters using gas or other hydrocarbon fuels, and especially to a heater of this type suitable for vaporizing liquefied gases which exist at a relatively low temperature.

In direct fired furnaces of known types, the liquid to be heated is circulated through tubes in or around the combustion zone, the tubes and their contents being heated both by radiation from flames in the combustion zone and by direct contact with the heated gases therefrom. When the liquid in the tubes is a liquefied gas to be heated or vaporized and the tubes are exposed directly to the products of combustion from the combustion zone, water vapor from the combustion zone is condensed on the tubes since the liquefied gases are at relatively low temperatures. These temperatures are normally considerably below the freezing point of water, especially in the case of liquid oxygen or other cryogenic fluids. The condensate on the tubes freezes because of the low temperature of the liquid in the tubes, resulting in a layer of ice covering the tubes. In addition to reducing the rate of heat transfer to the tubes and the liquid therein, the ice covering presents another problem in that the flue gas is super-cooled. Eventually a thermal equilibrium is established at which time water derived from the condensed products of combustion flows into the bottom of the combustion chamber and where it may enter the burner openings. The presence of sufficient water around and in the burner quenches the flame and renders the furnace inoperative.

Furnaces or heaters with electrical heating units have been proposed, but such an arrangement has several objections from a practical viewpoint. In the first place, they are not economical to operate since the cost of electrical energy is higher per B.t.u. than is the cost of the same energy derived from hydrocarbon fuels. Furthermore, heaters with electrical units lack flexibility in operation and are not adapted to rapid start up and quick shut down, as is a furnace with a gas or oil burner.

Indirectly heated furnaces using a liquid heat transfer medium are complicated and thus more expensive by comparison, and are also objectionable as not being capable of quick start up and shut down. The mass of heat transfer liquid first must be heated, requiring time to do this; and when the furnace is shut down, the stored heat is wasted.

Thus, it is a general object of the present invention to provide a heater for low temperature liquids that eliminates the problem of condensation of water from the products of combustion when heating the liquid with hydrocarbon fuels.

It is also an object of the invention to provide a design for a heater which achieves both a high rate and efficiency of heat transfer between the combustion zone and the liquid to be heated.

More especially, it is an object of the present invention to provide a novel construction for a direct fired furnace that retains the advantages of simple construction and rapid response to start up and shut down yet eliminates the problems arising from condensation of water vapor generated by combustion of fuels.

These objects are accomplished in a heater for low temperature fluids according to the present invention by providing a suitable shell, normally lined with a refractory material, conduit means within the shell containing the fluid to be heated, said fluid having an initial temperature below the freezing point of water, a source of heat within the shell, and a heat conductive and radiating baffle interposed between the source of heat and the conduit means in heat receiving relation to the combustion zone and in heat radiating relationship to the conduit means. Typically, the source of heat is a combustion zone adjacent a burner for hydrocarbon fuel, the baffle isolating the conduit means from the combustion zone. The conduit means are surrounded by a substantially moisture free atmosphere which may be provided by an inert gas, for example, nitrogen or helium; and it is preferable that the inert gas be circulated through the space around the tubes and into contact with the heated baffle in order to transfer additional heat by convection and conduction from the baffle to the tubes for the purpose of increasing the heat transfer efficiency.

How the above objects and advantages of the invention, as well as others not specifically referred to herein, are attained will be more easily understood by reference to the following description and to the annexed drawing, of which:

FIG. 1 is a vertical median section through a radiant heater constructed according to the present invention, having a central combustion zone within a cylindrical shell.

FIG. 2 is a horizontal section on line 2—2 of FIG. 1.

FIG. 3 is a vertical median section through a variational form of heater in which several separated combustion zones are maintained, banks of tubes holding the low temperature fluid being interposed between successive combustion zones.

FIG. 4 is a schematic perspective of a portion of a heater having a horizontally extending combustion zone.

Referring now to the drawing, and particularly to FIG. 1, it will be seen that the heater therein comprises a generally cylindrical shell or housing indicated generally at 10 and consisting of an outer wall 11 of steel plate and an inner lining 12 of a suitable refractory material. At bottom wall 13 there is located centrally of the shell a burner 41 to which fuel is supplied through pipe 15. Typically, this fuel is gas, although oil may likewise be used. Adjacent and above burner 14 there is maintained centrally of and within shell 10 a combustion zone 16 in which the heated products of combustion rise and leave the heater through stack 18.

Inside shell 10 and surrounding combustion zone 16 is located conduit means for low temperature liquid to be heated, such means typically being an annular arrangement of vertically extending tubes 20. A single row of tubes is shown as illustrative of a typical location and arrangement of the tubes but it will be realized that the invention is not limited to any particular arrangement of the tubes. The vertical runs of tubes 20 are connected at their tops and bottoms in a suitable manner, as by U-shaped bends, thus providing a continuous conduit means for liquefied gas extending from inlet 21 to outlet 22. The number of inlets and/or outlets may be increased as desired. The inlet 21 to the tubes is connected to a suitable source of low temperature, liquefied gas under pressure, not shown in the drawings, and also to a suitable receiver (not shown) for the compressed gas leaving the heater through outlet 22. A pump 23 may be provided to introduce low temperature liquid into conduit means 20.

Interposed between combustion zone 16, which is the source of heat, and tubes 20 containing the low temperature fluid, is a heat conductive baffle 25 annularly spaced at 26 from the inside face of shell 10. Baffle 25 is generally cylindrical in shape, surrounds combustion zone 16, and extends from bottom wall 13 to the top of the shell. As shown in the drawing, it preferably has gas tight connections at both the top and the bottom with shell 10 and bottom wall 13 respectively in order to completely and effectively isolate annular space 26 and conduit means 20 therein from the combustion zone 16. Viewed in vertical or longitudinal section, the baffle is preferably annularly corrugated as shown in FIG. 1. Alternatively the corrugations can extend vertically. The purpose of the corrugations is both to strengthen the baffle and to increase the total effective radiating surface of the baffle, it being possible in this way to increase the radiating surface by as much as 50%–60% over the area of a flat sheet of the same dimensions.

Baffle 25 is preferably made of a corrosion resistant metal since it is heated on its inner face by direct contact with the products of combustion in combustion zone 16. The heat thus imparted to the baffle is radiated outwardly from the baffle at its outer face to the conduit means 20 and thence by conduction to the fluid contents of the conduit means. Thus, baffle 25 not only isolates conduit means 20 from any contact with the products of combustion and thus eliminates the possibility of condensation on the tubes of any of the water vapor resulting from combustion of hydrocarbon fuel, but acts as an infra-red radiator radiating to tubes 20.

It is preferable that the tubes 20 be in a substantially moisture free atmosphere in order that they may be dry and clean at all times. For this purpose it would be sufficient that the annular space 26 between shell 10 and baffle 25 be filled with any suitable dry, inert gas, for example, nitrogen or helium. However, the rate of heat transfer between the baffle and the conduit means can be improved by as much as 30% by providing for forced circulation of the gas in this space. This circulation equalizes temperatures throughout the annular space and increases the rate of heat transfer between the gas and the tubes. For this purpose, it is desired to provide fan 28 having its inlet connected by duct 29 with one end of annular space 26 and its exhaust connected by duct 30 with the other end of annular space 26. Thus, gas withdrawn from one end of the heater space containing tubes 20 is circulated through the fan and introduced at the other end of said space. To effect a more or less uniform distribution of the dry gas circulating around the conduit means, it is preferable to provide a plurality of axially spaced annular baffles 32 which force the gas to follow a tortuous path within annular space 26 between inlet duct 30 and exhaust duct 29. These baffles are incomplete circles, having gaps 32a for the gas to pass around the baffle.

Adequate forced circulation of gas in the space 26 also reduces the temperature of the baffle at the burner end and raises the temperature at the upper end.

The tube space 26 is normally under superatmospheric pressure. This increases the density of the gas and correspondingly increases its specific heat, making it more effective to transfer heat to the tubes. Typically a pressure of at least 5 or perhaps 10 atmospheres will be maintained, though it may be more or less. The cylindrical shape of the shell and baffle 25 are advantageous to resist the pressures imposed. To limit the gas pressure to a predetermined value, a relief valve 34 is placed in the system. It is also preferred to include a tank 35 of make up gas, supply being controlled by a pressure regulator 36.

Referring now to FIG. 3, there is shown therein a variational embodiment of the invention in which the furnace indicated generally at 40 is rectangular in outline and has rectangular walls. Otherwise, it is constructed essentially the same as previously described. At intervals within the shell are located banks of horizontally extending tubes 41 providing the conduit means through which the low temperature fluid flows. In each bank the tubes are arranged one above another and are connected at their ends by vertically extending manifolds or in any other suitable manner to provide for circulation of fluid horizontally through the tubes.

At two sides of each of the interior banks of tubes 41 is a baffle 43 defining two sides of a tube space 44. A pair of such baffles is preferably connected by metal plates, flat or corrugated, at the top, bottom, and ends of the baffles to form a box-like enclosure of each tube space 44. Combustion spaces 47 are thus defined at two opposite sides by two baffles 43, each combustion space 47 having at the bottom a burner 45 to which fuel is supplied through pipe 46. The burner in each combustion space 47 provides a source of heat which is transmitted through baffles 43 at each of two opposite sides of the combustion zone to the adjacent tubes 41. Baffles 43 radiating to tube spaces 44 are preferably corrugated as shown. The heated gases leave the combustion spaces 44 through stacks 48 at the top of the shell.

The low temperature fluid is circulated by pump 23 as before, while the inert gas is circulated serially through the tube spaces 44 by piping 49 and blower 50.

The construction shown in FIG. 3 has certain practical advantages. One advantage is that the heater requires a minimum amount of refractory lining for a given capacity. Such refractory lining may be limited to those areas on the furnace walls which are exposed directly to the combustion zone, as the tube spaces 44 insulate some wall areas. Another practical advantage is that the design lends itself to utilization of modular construction described below, thus allowing a wide range of heater sizes of different capacities to be made from standardized units.

It will be noted from FIG. 4 that a vertically extending bank of horizontal tubes 41 may be enclosed with a rectangular box consisting of two spaced generally parallel baffles 43 connected by top and bottom walls 52 and end walls 53. This box together with the contained tubes 41 may be regarded as a module 54 from which the heater is constructed. The entire module may be shop assembled with the tubes in place. For a small heater, a single module may be sealed to contain an inert, dry atmosphere and gas circulation system omitted. Field construction is limited to assembling within a suitable shell a plurality of these modules as in FIG. 3 and adding the necessary piping connections to supply fuel to the burners and low temperature fluid to the tubes 41. Normally piping 49 and blower 50 will also be used.

Use of a module 54 in a heater provides for a very flexible construction since the modules also lend themselves to placing the burner in one of the vertical walls and a stack in the other opposite vertical wall, as shown in FIG. 4. Modular construction allows the expansion of the heater by addition of one or more modules, preferably spaced from an existing one, with corresponding extension of the shell, to provide a combustion space between each two successive modules. From a practical standpoint, this characteristic is valuable since it allows standardization of sizes and shop assembly of a substantial portion of the heater while at the same time providing flexibility in design and the manufacture of heaters from standardized units that can range up to capacity of as high as twenty-five million B.t.u. per hour.

From the foregoing description it will be understood that there may occur to persons skilled in the art various changes in the arrangement and disposition of the elements of a heater constructed according to the present invention without departing from the spirit and scope of the invention. Accordingly, it is to be understood that the foregoing description is considered to be illustrative of, rather than limitative upon, the invention as defined by the appended claims.

I claim:

1. A radiant heater for low temperature fluids having a boiling point below the freezing point of water, comprising in combination:

a shell;

a burner for hydrocarbon fuel within the shell adapted to establish and maintain a combustion zone containing water vapor;

wall means exposed to the combustion zone on one side and defining an enclosed space from which said water vapor is excluded by said wall means, said wall means receiving heat from the combustion zone and radiating such heat into said space;

and conduit means inside the shell and disposed entirely within said space receiving heat radiated from the wall means, said conduit means being filled with a fluid having a boiling point below the freezing point of water to be vaporized and having inlet and outlet connections outside said shell.

2. A radiant heater for low temperature fluids as in claim 1 that also includes a body of inert, substantially moisture-free gas in said enclosed space.

3. A radiant heater for low temperature fluids as in claim 2 that also includes means for maintaining said body of inert gas under superatmospheric pressure.

4. A system for vaporizing low temperature liquefied gases having a boiling point below the freezing point of water, comprising in combination:

a shell;

a burner for hydrocarbon fuel within the shell adapted to establish and maintain a combustion zone containing water vapor;

wall means exposed to the combustion zone on one side and defining an enclosed space from which said water vapor is excluded by said wall means, said wall means receiving heat from the combustion zone and radiating such heat into said space;

conduit means in said space receiving heat radiated from the wall means, said conduit means being filled with a low temperature fluid to be vaporized and having inlet and outlet connections outside said shell;

a body of inert, substantially moisture-free gas in said enclosed space;

said fluid comprising liquefied gas from a source of liquefied gas at a temperature below the freezing point of water;

and means circulating said liquefied gas into and through the conduit means to vaporize the liquefied gas.

5. A system as in claim 4 which also includes means for maintaining the body of gas in said enclosed space and around the conduit means at superatmospheric pressure.

6. A system as in claim 4 which also includes means for circulating the inert gas within the enclosed space and around the conduit means.

7. A system as in claim 4 that includes a pressure relief valve to limit pressure of the inert gas around the conduit means to a predetermined superatmospheric pressure, and a supply of make-up gas to replace inert gas lost.

References Cited by the Examiner

UNITED STATES PATENTS

| 2,182,586 | 12/1939 | Heid | 122—356 |
|---|---|---|---|
| 2,539,291 | 1/1951 | Williamson | 62—52 |

FOREIGN PATENTS 584,192   9/1959   Canada.

OTHER REFERENCES

Publication: Chemical Engineering, vol. 69, No. 8, page 104, published by McGraw Hill of New York, 4/16/62, TNIM 45.

FREDERICK L. MATTESON, JR., *Primary Examiner.*

KENNETH W. SPRAGUE, *Examiner.*